Aug. 8, 1950      E. AINLEY      2,517,619
ELECTRICAL ANTITHEFT DEVICE FOR MOTOR VEHICLES
Filed Dec. 16, 1947
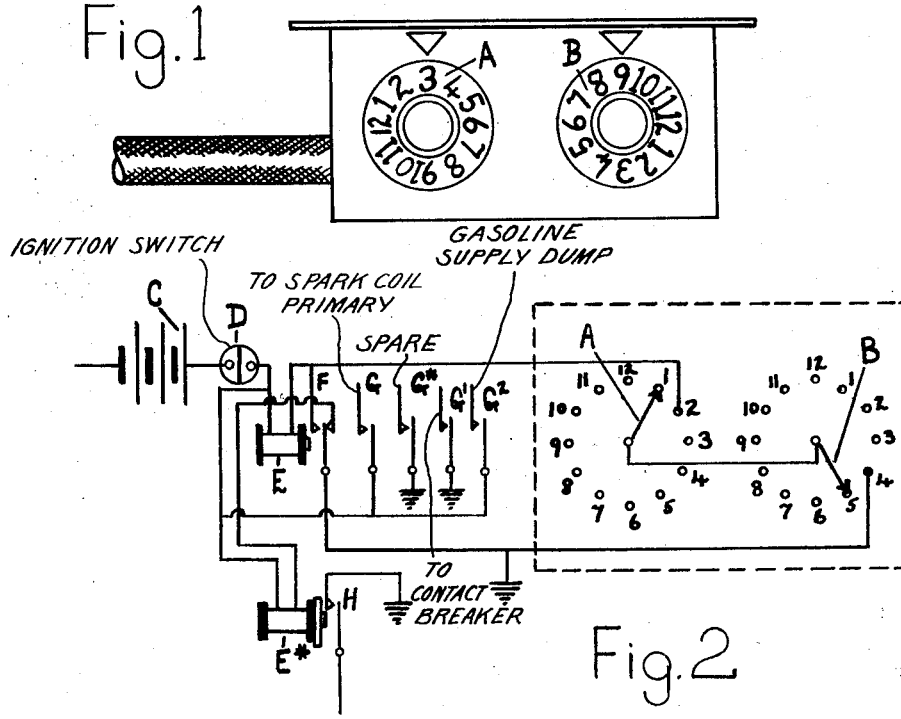
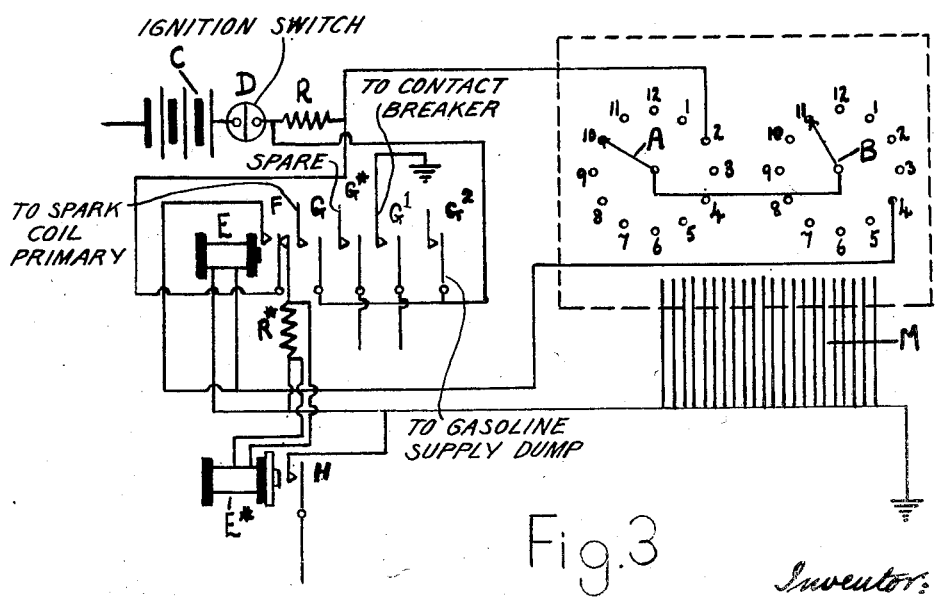

Patented Aug. 8, 1950

2,517,619

UNITED STATES PATENT OFFICE 2,517,619

ELECTRICAL ANTITHEFT DEVICE FOR MOTOR VEHICLES

Ellis Ainley, London, England, assignor to Alverstone Products Limited, London, England Application December 16, 1947, Serial No. 792,078

4 Claims. (Cl. 177—314)

This invention relates to safety or anti-theft means for motor vehicles its object being to provide a method of and means for giving a maximum amount of protection against unauthorised removal of the vehicle as well as a warning if an attempt to do so is made, whilst ensuring a minimum of inconvenience and loss of time to the owner when the vehicle is required by him.

According to the present invention I provide an electrical combination locking apparatus which is adapted to control the electrical circuits to the ignition and to a warning device such as the horn.

In a practical embodiment of the invention, there is provided in the ignition circuit of the vehicle, a control unit mounted in convenient proximity to the driver and a relay unit generally located under the hood of the vehicle, said relay unit being controlled by the control unit through the intermediary of a flexible cable and having cables or leads to various points in the ignition circuit as well as to horn circuit and to an electric gasolene supply pump where such is fitted.

The control unit consists of one or more numbered or lettered dials for the purpose of giving an appropriately large number of combinations whilst the relay unit consists of a pair of relays one of which operates a series of contacts and the other of which is slow operating with slow release for the purpose hereinafter set forth.

In addition in some cases it may be desirable to provide a pair of resistors in the circuit one of which serves to protect the battery from short circuiting and the other causes still slower action of the slow operating relay.

To understand the principle it will be presumed that the control unit consists of two dials each having twelve numbers thus providing 144 possible combinations thereof.

To start the vehicle it is necessary to set the dials with the proper code numbers, switch on the ignition and the car will then start in the ordinary way, the circuit being from the battery to the ignition switch, the first relay, to the control dials and to earth.

To understand the principle of the invention, the same is shown diagrammatically and by way of simple example in the accompanying drawings where the control unit consists of two dials each having twelve numbers or digits so providing 144 possible combinations thereof. It is however to be understood that the dials, of which there may be more than two, can have whatever number of digits desired.

In these drawings:

Figure 1 shows the control box; Fig. 2 shows the basic system, and Fig. 3 a more elaborate control.

Firstly the user decides upon the number combination he wishes to adopt for his vehicle. Naturally numbers may be replaced by letters.

In example, Fig. 2, the combination code selected is 2, 4 and therefore the dials A, B must be set respectively to numbers (or contacts) 2, 4 in order to start up the engine, the ignition having been switched on. The circuit will be from battery C to ignition switch D to the first relay E to control $A^2$, control $B^4$ and to earth as seen in Fig. 2. This relay E will thus operate contacts G, $G^*$, $G^1$ and $G^2$ and restore the ignition circuit and gasolene supply pump circuit to normal conditions. Relay $E^*$ being slow acting and slow release will not act before switch F is closed after which it is inoperative. Contact $G^*$ is a spare contact which could be used for switching on and off any other desirable apparatus.

Controls A, B can then be changed to any other numbers without affecting the running of the vehicle since relay E is held by the closed switch F.

When the ignition switch D is turned off relay E is released and out of circuit whereupon the car is at once protected against unauthorised user.

Thus the car can be handed over to some other person whilst still running but with the controls A, B incorrectly set, in order to garage the vehicle and once the ignition is switched off, the vehicle cannot be restarted unless the correct code number is known.

If the ignition is switched on with controls A, B incorrectly coded, relay E will not be actuated and switch F will be unaffected. Relay $E^*$ however will close and complete the circuit to the horn H.

In the more practical embodiment shown at Fig. 3 there has been added a resistor R to prevent risk of shorting the battery. A second resistor $R^*$ can be added in parallel with relay $E^*$ to lengthen the holding time thereof and prevent it from operating in series with the ignition warning light when switching off the ignition.

A multicore cable indicated by M and connected to the several numbers of the controls A, B will circumvent operation of the equipment by cutting the simple cables of Fig. 2 leading to the control boxes A, B and short circuiting the ends thereof, because if a multicore cable is cut there would be exposed the multiple leads therein and it would be necessary to identify and connect up the correct pair for operating the mechanism which is a task calling for much time.

This therefore provides that if the combination is not known so that contacts are open at A and B, and the ignition switch is turned on, the car is protected in that:

1. The circuit from the battery C through ignition switch D, switch A, and switch B to earth remains broken, whereby relay E is not actuated, and relay E* remains actuated causing a warning to sound.

2. As a result of the non-operation of relay E, the circuit from the battery C through the ignition switch D to the coil primary contacts G remains broken.

3. The circuit which would be completed through contact $G^1$ from the contact breaker to earth is not completed.

4. The circuit which would normally be completed through the contact $G^2$ from the battery C to the gasoline supply pump is not completed.

It is obvious that if the present device is removed it would still entail re-wiring the vehicle before it could be set going.

Thus, if the combination is incorrectly set, the contact switch F which is in parallel will not operate but instead the second or slow operating relay E* will be actuated through C, D, E*, and immediately give an audible alarm through the horn H for a short time even if the ignition switch is turned off, this being due to the sluggish movement provided.

On the other hand if the engine has been started by the authorised setting of the correct combination, the correct combination can thereafter be changed without affecting the running since the first relay E is held by the closed contact F which is in parallel with the circuit to the control box A, B.

I claim:

1. Anti-theft device for motor vehicles comprising the usual supply battery one pole whereof is earthed in known manner, an ignition switch of known kind connected to the other pole thereof, a relay connected to the battery through the ignition switch, multi-contact selector switch means in series with said relay whereby a circuit may be completed therethrough to earth to energise the relay, a plurality of contacts on said relay connected in the circuits to the usual ignition coil, gasolene supply pump, and contact breaker adapted to complete the said circuits when the relay is energised, other contacts on said relay adapted to close when the relay is energised and complete the circuit through said relay to earth to keep it energised while the ignition switch is switched on, a second delayed action relay connected to the battery through the ignition switch and adapted when energised, to cause the usual horn to sound, and still other contacts on the first-mentioned relay which are closed at such times when the first-mentioned relay is not energised, said other contacts being connected between the second-mentioned delayed action relay and earth whereby the delayed-action relay will be energised whenever the ignition switch is switched on without the first-mentioned relay being energized by correct setting of the selector switch means.

2. Anti-theft device for motor vehicles as claimed in claim 1 wherein the selector switch means comprises a casing, a pair of single-pole multi-way wiper switches of known kind disposed therein, a ciphered dial for each switch arranged externally of the casing whereby the switches may be set to required positions, a connection from one fixed contact of one said switch to the first relay, a connection from one fixed contact of the other said switch to earth, and a connection between the wiper contacts of both said switches whereby a circuit is completed from the first-mentioned relay aforesaid to earth when both said switches are set to make contact.

3. Anti-theft device for motor vehicles as claimed in claim 1 wherein a multi-core cable is used to carry the connections between the first-mentioned relay and the selector switch means, and between the selector switch means and earth, whereby if said multi-core cable is cut it will be substantially impossible for any unauthorised person to complete a circuit through the first-mentioned relay to energise it because of the large number of broken connections presented, the correct wires of which would have to be located and rejoined to obtain operation of the ignition coil, gasolene supply pump, and contact breaker.

4. Anti-theft device for motor vehicles as claimed in claim 1 comprising a resistor arranged in series between the ignition switch and the first-mentioned relay, and another resistor arranged in series in the energising circuit of the delayed action relay, to protect the battery from overloading if either relay should short circuit.

ELLIS AINLEY.

REFERENCES CITED

The following references are of record in the file of this patent:

UNITED STATES PATENTS

| Number | Name | Date |
|---|---|---|
| 616,079 | Coleman | Dec. 20, 1898 |
| 1,300,160 | Evans et al. | Apr. 8, 1919 |
| 1,552,136 | Galdi et al. | Sept. 1, 1925 |
| 2,251,735 | Goleby | Aug. 5, 1941 |